(12) United States Patent
Huang

(10) Patent No.: US 9,638,335 B2
(45) Date of Patent: May 2, 2017

(54) DOUBLE SEALING VALVE

(71) Applicant: KING LAI HYGIENIC MATERIALS CO., LTD, Hsinchu County (TW)

(72) Inventor: Shu-Mei Huang, Hsinchu County (TW)

(73) Assignee: King Lai Hygienic Materials Co., Ltd., Zhubei, Hsinchu County (TW)

( * ) Notice: Subject to any disclaimer, the term of this patent is extended or adjusted under 35 U.S.C. 154(b) by 0 days.

(21) Appl. No.: 14/592,675

(22) Filed: Jan. 8, 2015

(65) Prior Publication Data
US 2016/0201810 A1    Jul. 14, 2016

(51) Int. Cl.
| | |
|---|---|
| F16K 3/18 | (2006.01) |
| F16K 3/02 | (2006.01) |
| F16K 3/316 | (2006.01) |
| F16K 31/122 | (2006.01) |
| F16K 27/04 | (2006.01) |
| F16K 51/02 | (2006.01) |

(52) U.S. Cl.
CPC ............. *F16K 3/184* (2013.01); *F16K 3/029* (2013.01); *F16K 3/0254* (2013.01); *F16K 3/3165* (2013.01); *F16K 27/044* (2013.01); *F16K 31/122* (2013.01); *F16K 51/02* (2013.01)

(58) Field of Classification Search
CPC ........ F16K 3/029; F16K 3/184; F16K 3/3165; F16K 3/0254; F16K 51/02; F16K 31/122; F16K 27/044; F16K 3/16; F16K 3/18
USPC .......................... 251/195, 167, 197, 202–203
See application file for complete search history.

(56) References Cited

U.S. PATENT DOCUMENTS

| | | | | |
|---|---|---|---|---|
| 442,458 A | * | 12/1890 | Ross .................. | F16K 3/184 251/198 |
| 1,023,955 A | * | 4/1912 | North ................ | F16K 3/186 137/243 |
| 1,823,394 A | * | 9/1931 | Geiger .............. | F16K 3/3165 251/326 |
| 3,216,694 A | * | 11/1965 | Perazone .......... | F16K 51/02 251/158 |

(Continued)

FOREIGN PATENT DOCUMENTS

| | | |
|---|---|---|
| DE | 10196376 B4 | 8/2008 |
| DE | 102007034926 A1 | 2/2009 |

(Continued)

*Primary Examiner* — Mary McManmon
*Assistant Examiner* — David Colon Morales
(74) *Attorney, Agent, or Firm* — Muncy, Geissler, Olds & Lowe, P.C.

(57) ABSTRACT

A double sealing valve includes a power cylinder having a driving axle, a valve body formed of a first and a second valve members, and a seal plate assembly within the valve body. Therein, the first valve member has an axle bore for the driving axle to pass through, and the second valve member has two valve holes oppositely disposed. The seal plate assembly has a driving frame connected to the driving axle, with plural roller assemblies disposed around the driving frame. The seal plate assembly has two seal plates disposed between two faces of the driving frame and the valve body, respectively. Each seal plate has plural driving grooves corresponding to the roller assemblies. The driving axle drives the seal plate assembly to seal the valve holes, with a sealing force produced therebetween by use of the roller assembly and the driving groove.

11 Claims, 9 Drawing Sheets

(56) References Cited

U.S. PATENT DOCUMENTS

| | | | | |
|---|---|---|---|---|
| 4,007,906 A | * | 2/1977 | Karpenko | F16B 37/043 251/203 |
| 4,052,036 A | * | 10/1977 | Schertler | F16K 51/02 251/144 |
| 4,238,111 A | | 12/1980 | Norman | |
| 4,291,861 A | * | 9/1981 | Faria | F16K 3/184 251/158 |
| 4,301,993 A | | 11/1981 | Waller | |
| 4,470,576 A | * | 9/1984 | Schertler | F16K 51/02 251/158 |
| 4,480,659 A | * | 11/1984 | Peacock | F16K 3/184 137/630.12 |
| 4,495,966 A | | 1/1985 | Longamore | |
| 4,779,649 A | * | 10/1988 | Balter | F16K 3/186 137/630.12 |
| 4,817,915 A | | 4/1989 | Tinner | |
| 5,029,809 A | | 7/1991 | Coureau | |
| 5,118,078 A | | 6/1992 | Younker | |
| 5,135,032 A | | 8/1992 | Parks, Jr. | |
| 5,220,943 A | | 6/1993 | Zink | |
| 5,228,473 A | | 7/1993 | Zink | |
| 5,238,022 A | | 8/1993 | Zink | |
| 5,269,491 A | * | 12/1993 | Reynolds | F16K 51/02 251/169 |
| 5,280,874 A | | 1/1994 | Zink et al. | |
| 5,285,998 A | | 2/1994 | Zink et al. | |
| 5,379,983 A | | 1/1995 | Geiser | |
| 6,079,693 A | | 6/2000 | Ettinger et al. | |
| 6,089,537 A | | 7/2000 | Olmsted | |
| 6,308,932 B1 | | 10/2001 | Ettinger et al. | |
| 6,328,051 B1 | | 12/2001 | Maher | |
| 6,347,918 B1 | | 2/2002 | Blahnik | |
| 6,409,149 B1 | | 6/2002 | Maher, Jr. | |
| 6,517,048 B2 | | 2/2003 | Ettinger et al. | |
| 6,612,546 B2 | | 9/2003 | Young et al. | |
| 6,847,730 B1 | | 1/2005 | Beer et al. | |
| 6,883,776 B2 | | 4/2005 | Aggarwal et al. | |
| 6,905,107 B2 | | 6/2005 | Blahnik | |
| 7,004,453 B1 | | 2/2006 | Cheng | |
| 7,036,794 B2 | | 5/2006 | Duelli et al. | |
| 7,086,638 B2 | | 8/2006 | Kurita et al. | |
| 7,090,192 B2 | | 8/2006 | Weiss | |
| 7,159,846 B2 | | 1/2007 | Aggarwal et al. | |
| 7,481,417 B2 | | 1/2009 | Mayer et al. | |
| 8,132,782 B2 | | 3/2012 | Duelli et al. | |
| 8,141,847 B2 | | 3/2012 | Fischer | |
| 8,419,337 B2 | | 4/2013 | Tateshita et al. | |
| 8,567,756 B2 | | 10/2013 | Behdjat et al. | |
| 8,833,388 B2 | | 9/2014 | Eto et al. | |
| 2010/0050534 A1 | | 3/2010 | Behdjat et al. | |
| 2011/0033266 A1 | | 2/2011 | Tateshita et al. | |
| 2012/0227830 A1 | | 9/2012 | Eto et al. | |
| 2013/0243560 A1 | | 9/2013 | Kimrey, Jr. et al. | |
| 2014/0042354 A1 | * | 2/2014 | Orr | F16K 3/0254 251/329 |

FOREIGN PATENT DOCUMENTS

| | | |
|---|---|---|
| DE | 102007034927 A1 | 2/2009 |
| EP | 1063457 A2 | 12/2000 |
| EP | 1688654 A1 | 8/2006 |
| EP | 2740979 A1 | 6/2014 |
| WO | 0201035 A2 | 1/2002 |
| WO | 0201097 A2 | 1/2002 |
| WO | 03012323 A1 | 2/2003 |

\* cited by examiner

DOUBLE SEALING VALVE

BACKGROUND OF THE INVENTION

1. Field of the Invention

The present invention relates to sealing assemblies of a valve, and more particularly, to vacuum valve having double seal plates and capable of solidly sealing.

2. Description of the Related Art

As disclosed in FIGS. 19~21 of U.S. Pat. No. 7,090,192, a vacuum valve comprises a valve body internally provided with a gate assembly rotatably driven by a swing arm, wherein the gate assembly is allowed to open or close against a valve opening of the valve body. Therein, the gate assembly has two gate plates, one steel ball plate between the two gate plates, and a plurality of rolling steel balls on the steel ball plate. Also, the inner side of the gate plate is provided with a plurality of driving grooves corresponding to the rolling steel balls, while the depth of the driving grooves varies from being deep to shallow. When the gate assembly seals the valve opening, the steel ball plate is further driven, such that the rolling steel balls move from the deep position to the shallow position of the driving grooves. As a result, the two gate plates are pushed outward, separately, such that the gate plates rigidly contact the valve opening to achieve a highly seal air-tight status.

However, the contact relationship between the rolling steel balls, the gate plates, and the driving grooves is a point-contact relationship. A counter force produced during the two gate plates being pushed outward concentrates on the contact points, so that the bearable pressure per unit square measure of the rolling steel balls is limited, so as to limit the contact force between the gate plates and the valve opening. Furthermore, due to the long period usage, the rolling steel balls are easily worn down and broken, causing the demand of maintenance. As a result, the valve body of such a vacuum valve needs to be dismantled, and all the components thereof shall be taken out for facilitating the maintenance of the components such as rolling steel balls, failing to meet the requirement of being conveniently applied.

SUMMARY OF THE INVENTION

For improving the abovementioned issues and inconveniences, the present invention discloses a double sealing valve, which further produces a sealing force when the seal plates seal the valve hole, so as to increase the air-tightness of the valve.

The present invention provides a double sealing valve, comprising:

at least a power cylinder provided with a driving axle capable of axially moving;

a valve body formed of a hollow first valve member and a hollow second valve member, the first valve member having a cylinder seat for receiving the power cylinder, an axle bore disposed on the cylinder seat for the driving axle to pass through into the first valve member, the second valve member provided with two valve holes oppositely disposed thereon;

a seal plate assembly disposed in the valve body and having a driving frame connected to one end of the driving axle, plural roller assemblies disposed around the driving frame, with each of the roller assemblies having a triangle roller seat, one corner part of the roller seat axially disposed on the periphery of the driving frame with the other two corners respectively provided with a roller bearing; furthermore, the seal plate assembly has two seal plates, while each of the seal plates is disposed between one of the two sides of the driving frame and the valve body, respectively, and each of the seal plates is concavely provided with plural driving grooves in an amount corresponding to the amount of the roller assemblies for allowing each of the roller bearings to slide in the corresponding driving groove.

The main objective of the present invention is that the driving axle triggers the seal plate assembly to move from the first valve member to the inner space of the second valve member. When the seal plate assembly pushes against the wall of the second valve member, the roller bearing of the roller seat is driven from a deep stop portion to a shallow slope portion, such that the distance between the two seal plates is increased, whereby the seal plates fittingly seal the valve hole. The roller seats effectively convert the force produced by the driving axle into a sealing force between the seal plates and the valve hole. Also, the roller bearing of each of the roller seat is able to contact the seal plates in a manner of line-contact and plane-contact, so as to effectively disperse the force between the roller bearing and the seal plates, increasing the capability of the roller bearings bearing the force, thereby allowing the driving axle to output a greater sealing force, thus increasing the general air-tightness of the valve and extending the service life of the valve The secondary objective of the present invention is that at least a buffer member is disposed on the one side of the driving frame opposite to the driving axle. In the preferred embodiment provided by the present invention, the buffer member is in axial alignment with the driving axle. When the seal plate assembly contacts the wall of the second valve member, the buffer member produces a buffering function for absorbing the impact force between the wall of the second valve member and the seal plate assembly, thereby preventing the components such as the driving frame and the seal plates from becoming deformed or damaged, thus increasing the service life of the product.

DETAILED DESCRIPTION OF THE INVENTION

Figure 1:
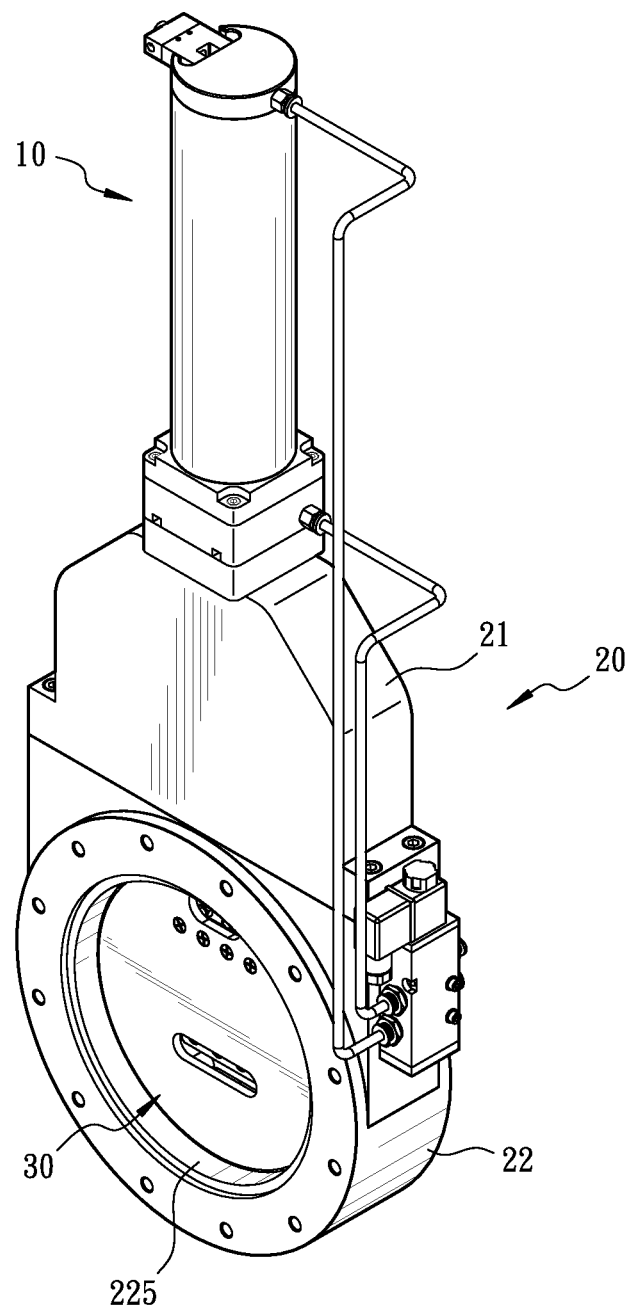
FIG. 1 is a perspective view of the double sealing valve in accordance with the present invention.
Figure 2:
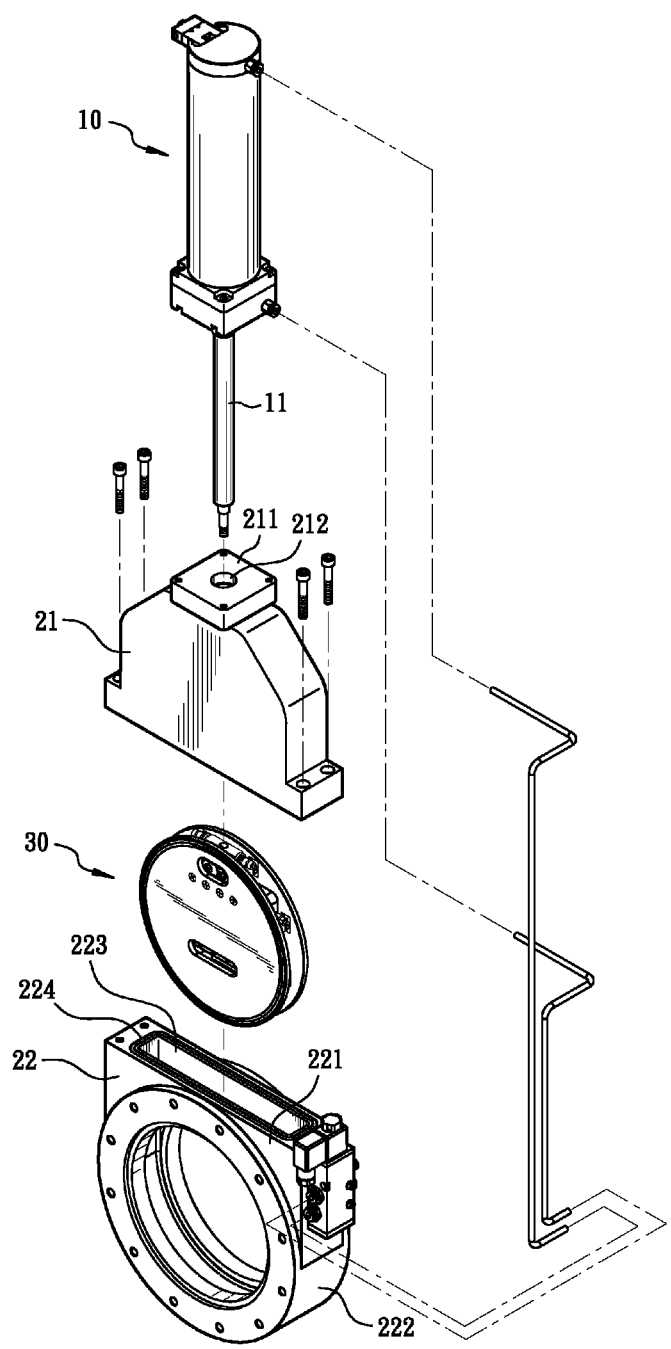
FIG. 2 is an exploded view of the double sealing valve in accordance with the present invention.
Figure 3:
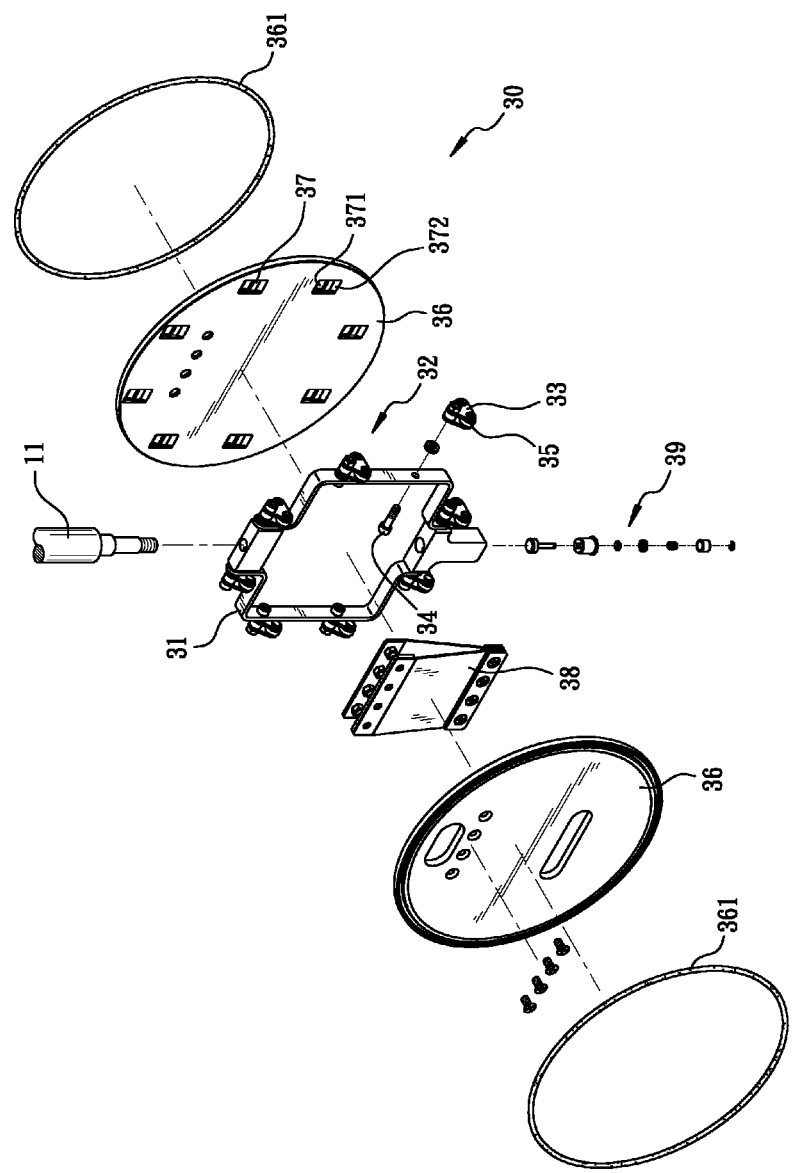
FIG. 3 is a partial exploded view of the seal plate assembly of the double sealing valve in accordance with the present invention.
Figure 4:
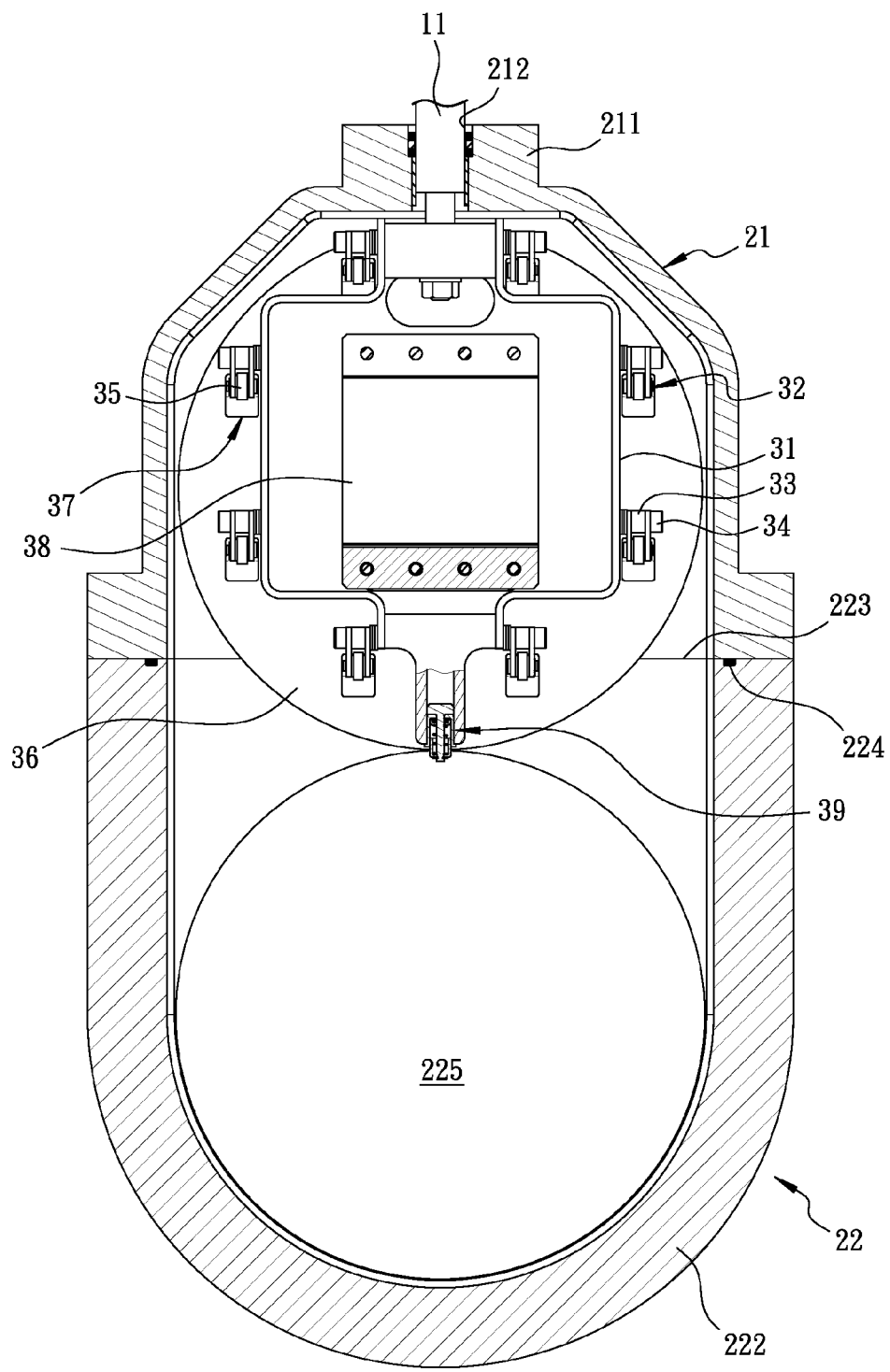
FIG. 4 is a sectional view of the double sealing valve in accordance with the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 4, the double sealing valve provided by the present invention comprises at least a power cylinder 10, a valve body 20, and a seal plate assembly 30.

The power cylinder 10 is provided with a driving axle 11 capable of axially moving. The power cylinder 10 is allowed to be a pneumatic cylinder or a hydraulic cylinder.

The valve body 20 is formed of a hollow first valve member 21 and a hollow second valve member 22. The first valve member 21 is provided with a cylinder seat 211 for receiving the power cylinder 10, while an axle bore 212 is disposed on the cylinder seat 211 for the driving axle 11 to pass through into the first valve member 21. The second valve member 22 is formed of two side boards 221 combined with at least an arc board 222, and the arc board 222 has an opening 223 for being connected with the first valve member 21, wherein the inner spaces of the first valve member 21 and the second valve member 22 are connected, such that the driving axle 11 is allowed to pass through into the first valve member 21 and the second valve member 22 from the axle bore 212. Also, two valve holes 225 are oppositely disposed on two side boards 221 of the second valve member 22, respectively. At least a seal member 224 is disposed on the periphery of the opening 223, whereby the first valve member 21 is allowed to air-tightly combined with the second valve member 22.

Figure 9:
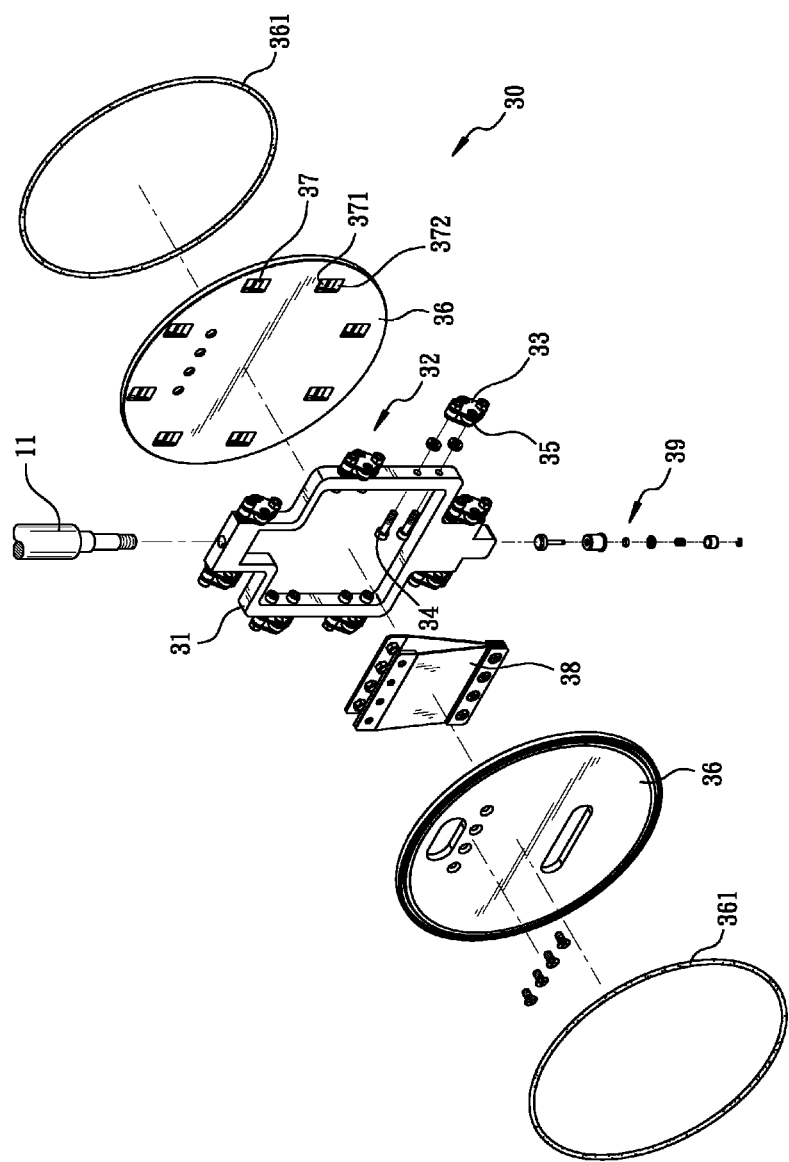
FIG. 9 is an exploded view of the seal plate assembly of the double sealing valve in another embodiment provided by the present invention.

The seal plate assembly 30 is disposed in the valve body 20 and comprises a driving frame 31 connected to one end of the driving axle 11. The periphery of the driving frame 31 is provided with a plurality of roller assemblies 32, wherein each roller assembly 32 includes a triangle roller seat 33 axially disposed on the periphery of the driving frame 31 through a roller axle 34. Also, the seal plate assembly 30 has two seal plates 36, while each of the seal plates 36 is disposed between one of the two sides of the driving frame 31 and the valve body 20, respectively. Each of the seal plates 36 is concavely provided with plural driving grooves 37 in an amount corresponding to the amount of the roller assemblies 32. Two roller bearings 35 are disposed on the roller seat 33 and contact the driving groove 37, such that each of the roller bearings 35 is allowed to slide in the corresponding driving groove 37. In the preferred embodiment, the roller seat 33 is a triangular seat, wherein the roller axle 34 is disposed on one corner part of the roller seat 33, while two roller bearings 35 are placed on the other two corners of the roller seat 33, respectively. In other embodiment, referring to FIG. 9, the roller seat 33 is formed as a rhombus shape, wherein two roller axles 34 are disposed on two corners of the roller seat 33 which are placed on the vertical axis thereof, and two roller bearings 35 are disposed on the other two corners on the horizontal axis thereof, so as to effectively decrease unnecessary swaying of the roller seat 33 and increase the stability and the force bearing capability thereof. At least a seal member 361 is disposed around the periphery on one side of each of the seal plate 36 opposite to the driving frame 31.

The two seal plates 36 are connected by at least an elastic member 38, while the elastic member 38 permanently keeps the two seal plates 36 getting close to each other. For example, the elastic member 38 is allowed to be a V-shaped spring board. One end of the driving frame 31 opposite to the driving axle 11 is provided with at least a buffer member 39. In the preferred embodiment, the buffer member 39 is in axial alignment with the driving axle 11.

Furthermore, the driving groove 37 is formed of a stop portion 371 and a slope portion 372. The stop portion 371 is disposed on one side of the driving groove 37 facing toward the driving axle 11, while the slope portion 372 is disposed on the other side of the driving groove 37 opposite to the driving axle 11. In addition, depth of the driving groove 37 from the stop portion 371 to the slope portion 372 varies from a deep depth to a shallower depth.

With the foregoing configuration, operation of the present invention will be illustrated below.

Referring to FIG. 1 to FIG. 4 illustrating the valve of the present invention in an open status, the driving axle 11 of the power cylinder 10 keeps the seal plate assembly 30 remaining in the first valve member 21, so as to keep the two valve holes 225 unobstructed.

Figure 5:
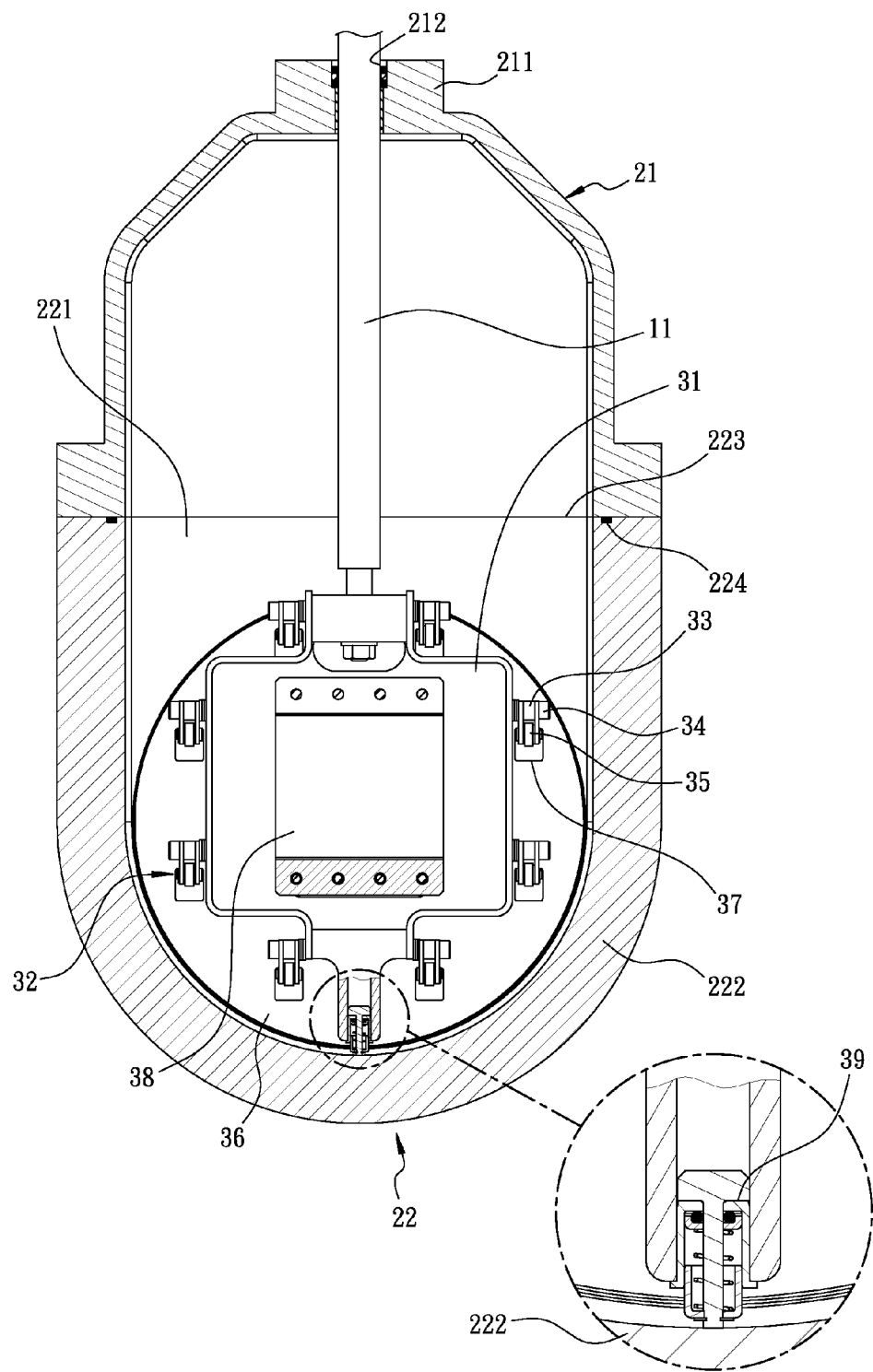
FIG. 5 is a first sectional schematic view illustrating the operation of the present invention.
Figure 6:
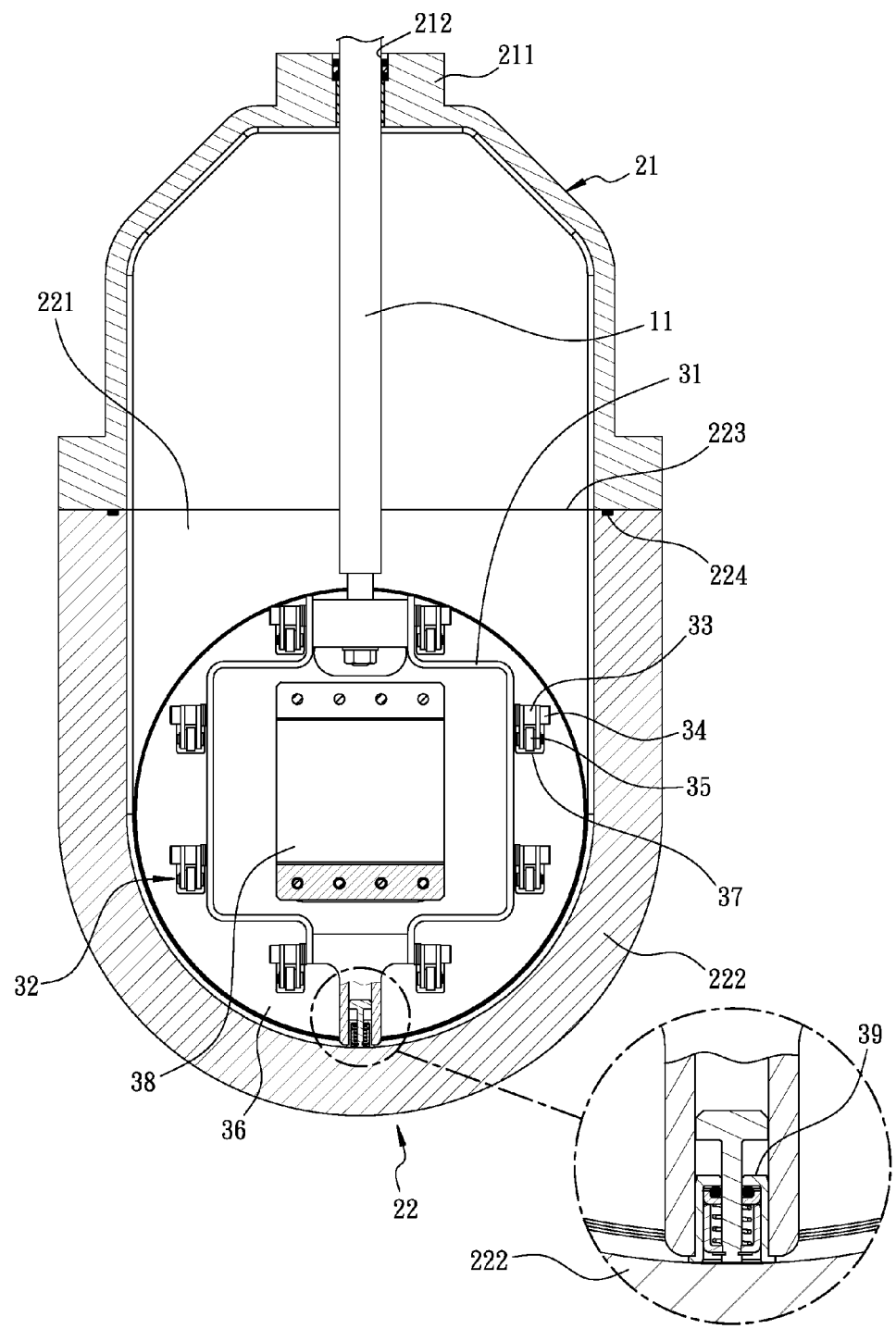
FIG. 6 is a second sectional schematic view illustrating the operation of the present invention.

Referring to FIG. 5 and FIG. 6, when the valve of the present invention is to be closed, the driving axle 11 of the power cylinder 10 triggers the seal plate assembly 30 to move from the first valve member 21 into the second valve member 22. When the seal plates 36 of the seal plate assembly 30 push against the arc board 222 of the second valve member 22, the seal plates 36 are in alignment with the two valve holes 225. Therein, when the seal plate assembly 30 contacts the arc board 222, the buffer member 39 produces a buffering function, so as to absorb the impact force between the arc board 222 and the seal plate assembly 30, thereby preventing the driving frame 31 and the seal plates 36 from being deformed or damaged, thus extending the service life of the product.

Figure 7:
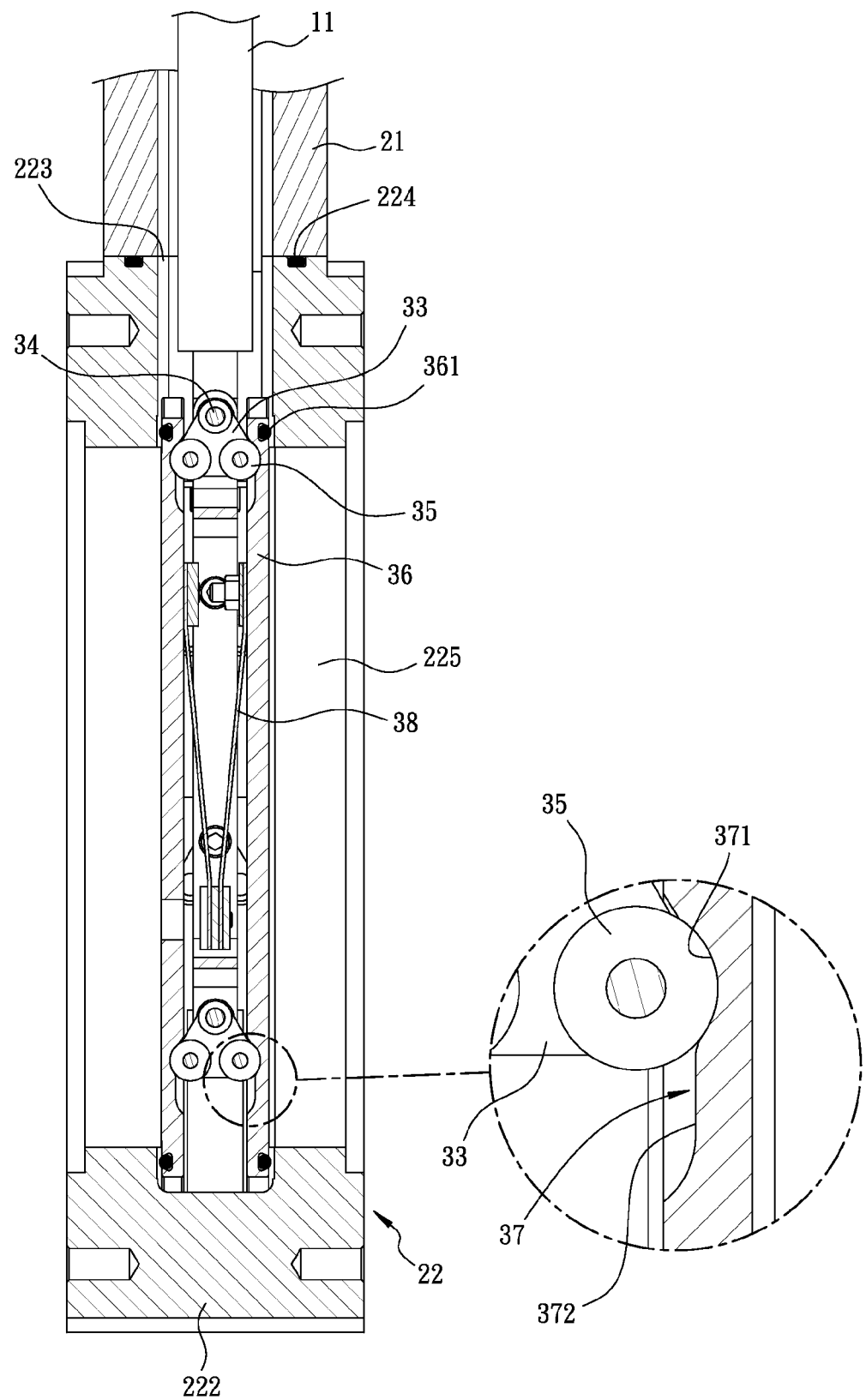
FIG. 7 is a third sectional schematic view illustrating the operation of the present invention.
Figure 8:
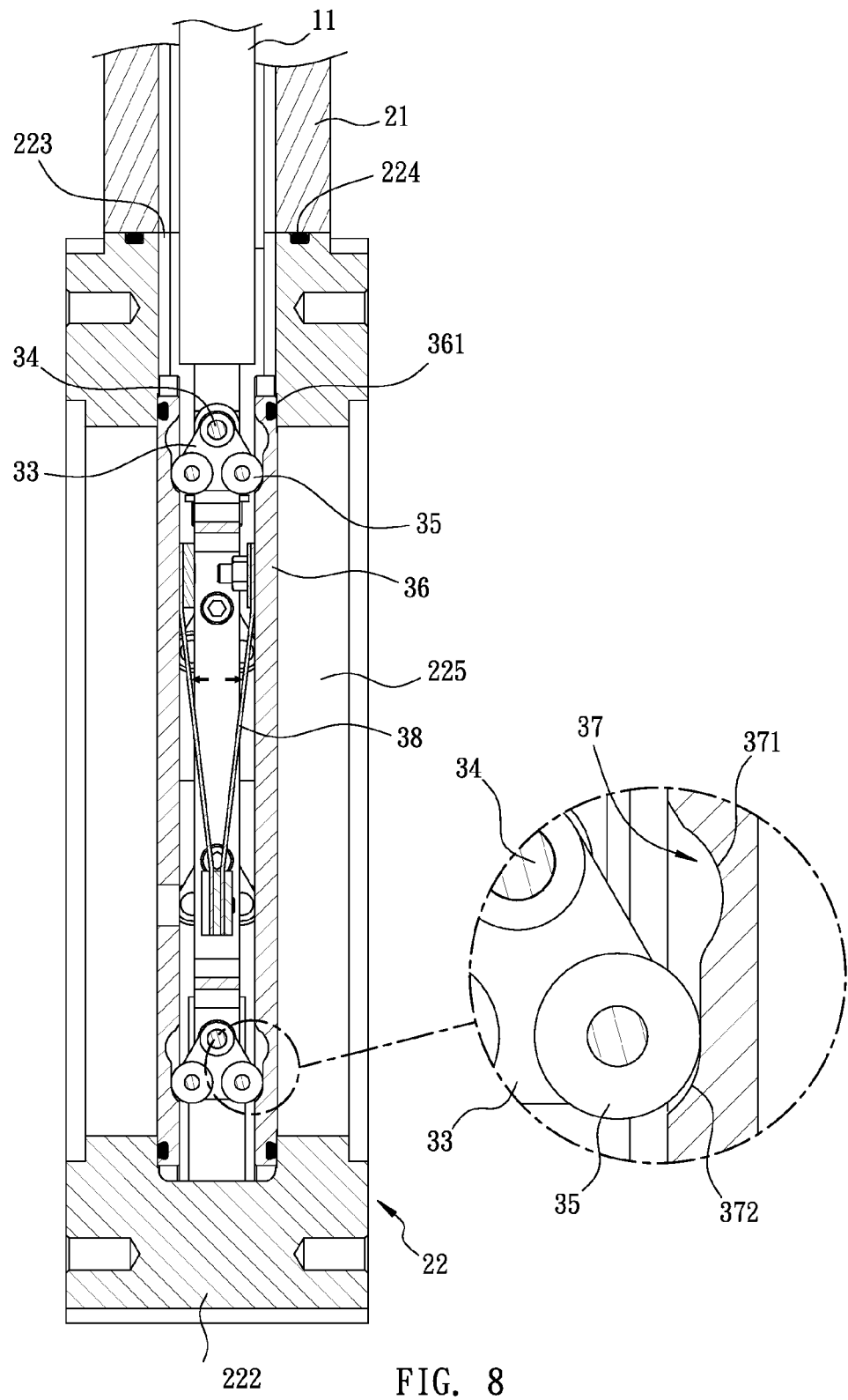
FIG. 8 is a fourth sectional schematic view illustrating the operation of the present invention.

After the seal plates 36 being in alignment with the two valve holes 225, the driving axle 11 continues pushing the driving frame 31, while the roller bearings 35 of each of the roller seat 33 is driven to slide from the deeper stop portion 371 (as shown in FIG. 7) to the shallower slope portion 372, so as to increase the distance between the two seal plates 36 (as shown in FIG. 8). Gaps between the seal plates 36 and the valve holes 225 are sealed, thereby achieving the air-tightness of the present invention. Also, the seal member 361 increases the air-tightness between each of the seal plates 36 and the corresponding valve hole 225.

In contrast, when the driving axle 11 is reversely operated, the roller bearings 35 of each of the roller seat 33 slides from the slope portion 372 to the stop portion 371, while the distance between the two seal plates 36 is shortened due to the resilient restoring force of the elastic member 38, thereby ceasing the air-tight status between the seal plates 36 and the corresponding valve holes 225. After the roller bearings 35 are engaged at the stop portion 371, the seal plate assembly 30 is driven to move back to the first valve member 21 by the driving axle 11, so as to open the valve holes 225.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A double sealing valve, comprising:
   at least a power cylinder provided with a driving axle capable of axially moving;
   a valve body formed of a hollow first valve member and a hollow second valve member, the first valve member having a cylinder seat for receiving the power cylinder, an axle bore disposed on the cylinder seat for the driving axle to pass through into the first valve member, the second valve member provided with two valve holes oppositely disposed thereon;

a seal plate assembly disposed in the valve body and having a driving frame connected to one end of the driving axle, plural roller assemblies disposed around the driving frame, with each of the roller assemblies having a roller seat, the roller seat formed in a polygonal shape with at least three sides and having at least three corners, the roller seat axially disposed on a periphery of the driving frame by at least a roller axle; furthermore, the seal plate assembly has two seal plates, while each of the seal plates is disposed between one of the two sides of the driving frame and the valve body, respectively, and each of the seal plate is concavely provided with plural driving grooves in an amount corresponding to the amount of the roller assemblies, while two roller bearings are disposed on two corners of the roller seat of each roller assembly for contacting the corresponding driving groove, such that each of the roller bearings is allowed to slide in the corresponding driving groove.

2. The double sealing valve of claim 1, wherein the driving groove is formed of a stop portion and a slope portion, while the stop portion is disposed on one side of the driving groove facing toward the driving axle, and the slope portion is disposed on the other side of the driving groove opposite to the driving axle.

3. The double sealing valve of claim 2, wherein a depth from the stop portion to the slope portion of the driving groove varies from deep to shallow.

4. The double sealing valve of claim 1, wherein at least a seal member is disposed around the periphery of the seal plate.

5. The double sealing valve of claim 1, wherein the two seal plates are connected by at least an elastic member.

6. The double sealing valve of claim 1, wherein one end of the driving frame opposite to the driving axle is provided with at least a buffer member.

7. The double sealing valve of claim 6, wherein the buffer member is in axial alignment with the driving axle.

8. The double sealing valve of claim 1, wherein the second valve member is formed of two side boards and at least an arc board, and the arc board has an opening for being connected with the first valve member, while an inner spaces of the first valve member and an inner space of the second valve member are connected, such that the driving axle is allowed to pass through into the first valve member and the second valve member from the axle bore.

9. The double sealing valve of claim 8, wherein at least a seal member is disposed on a periphery of the opening, such that the first valve member and the second valve member are air-tightly connected.

10. The double sealing valve of claim 1, wherein the roller seat is in a shape of a triangle, with the roller axle disposed on one corner thereof and two roller bearings disposed on the other two corners thereof, respectively.

11. The double sealing valve of claim 1, wherein the roller seat is in a rhombus shape, with two roller axles disposed on two corners of the roller seat placed on a vertical axis thereof and two roller bearings disposed on the other two corners on a horizontal axis thereof, respectively.

\* \* \* \* \*